UNITED STATES PATENT OFFICE.

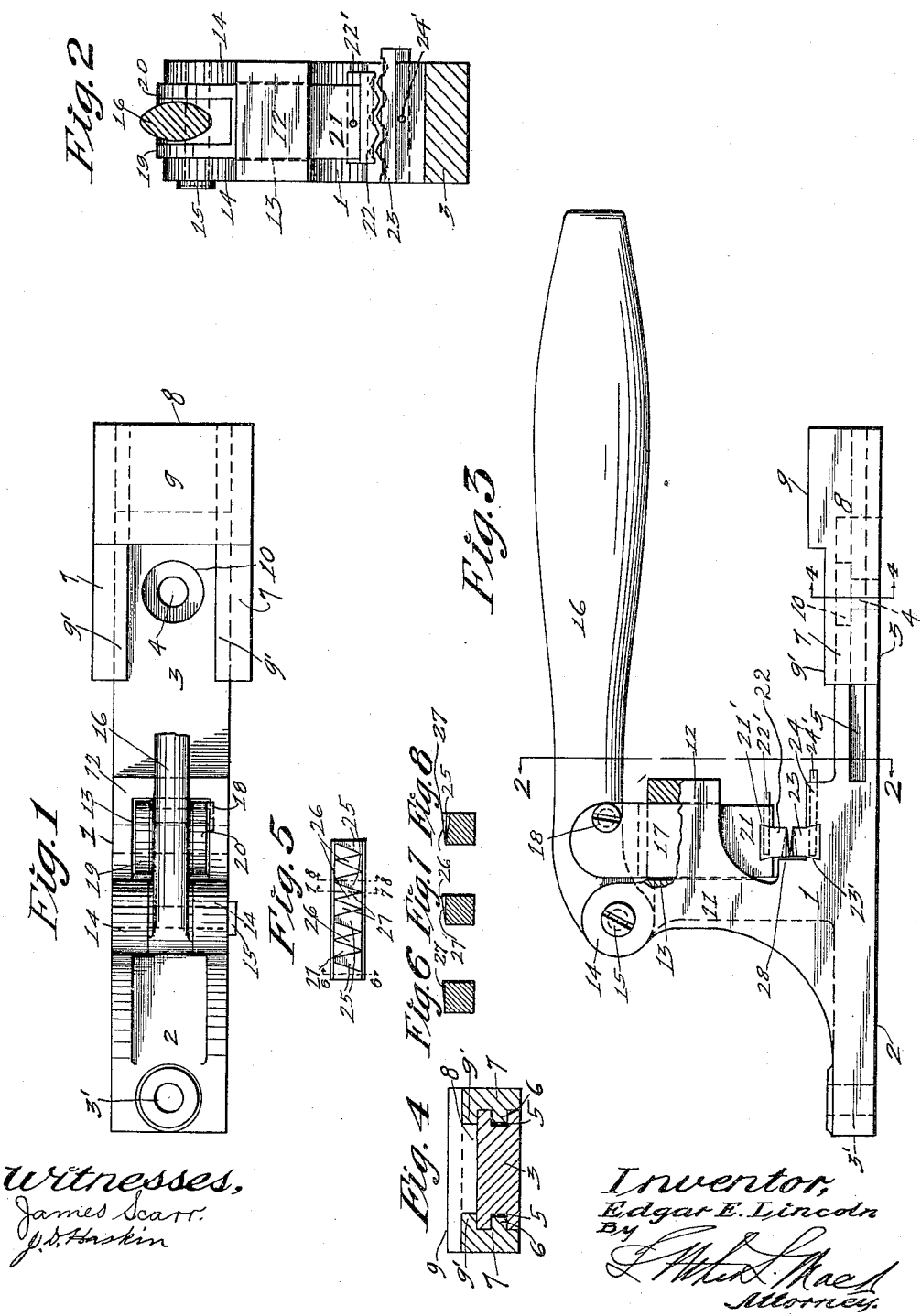

EDGAR E. LINCOLN, OF LOS ANGELES, CALIFORNIA.

SAW-SETTING MACHINE.

1,163,351. Specification of Letters Patent. Patented Dec. 7, 1915.

Application filed October 19, 1914. Serial No. 867,551.

*To all whom it may concern:*

Be it known that I, EDGAR E. LINCOLN, a citizen of the United States, residing at Los Angeles, in the county of Los Angeles and State of California, have invented a new and useful Improvement in Saw-Setting Machines, of which the following is a specification.

My device relates to tools for setting saws and has for its object the provision of means for simultaneously setting a plurality of oppositely directed teeth at a single operation and thus reducing the number of operations required to set the entire number of teeth in a saw and thereby greatly facilitating the work and economizing in the time of the mechanic.

A further object is to provide a machine provided with a pair of co-acting dies, removable from the machine at will for the purpose of substitution and means for locking the said dies in operating position in the machine.

A further object is to provide a machine having a single operating member adapted to act upon and set a plurality of saw teeth at a single operation thereof.

A further object is to provide a machine having adjustable means for resting the saw blade and holding the blade firmly in position during a setting operation.

A further object is to provide a machine of simplified construction, capable of being constructed and sold to the trade at a low cost and of being used as a stationary or portable fixture on a work bench or table.

Other objects may appear in the description.

My machine partakes somewhat of the form and character of an ordinary hand operated press and is provided with a pair of oppositely mounted setting dies having saw tooth seats formed in adjacent sides thereof, one of said dies being movable and the other being stationary, and said tooth seats being alternately inclined from the front to the rear side of the dies and the relative positions of the two die members being such that opposite tooth seats will correspond as to their inclination. The saw blade is adapted to be placed between the two die members in such a manner that the teeth on the saw will register with the tooth seats on the lower member and the rear edge thereof will rest upon an adjustable block which is provided on the base for holding the saw blade firmly in position.

Referring to the drawings, in which similar characters of reference indicate the same parts throughout the several figures, Figure 1 is a plan of my machine with a portion of the operating handle broken away; Fig. 2 is a sectional elevation of the same on the line 2—2, Fig. 3; Fig. 3 is a side elevation; Fig. 4 is a sectional elevation of the base and extensible saw rest, on the line 4—4, Fig. 3; Fig. 5 is a face view of one of the die members; Fig. 6 is a section of Fig. 5 on the line 6—6; Fig. 7 is a section of the same on the line 7—7; and Fig. 8 is a section of the same on the line 8—8.

As shown in Figs. 1, 2 and 3, 1 is a suitable base upon which all of the mechanism is mounted and which is provided with the lower extended portions 2 and 3 having the bores 3' and 4 in their extremities, through which suitable bolts or screws may be inserted for securing the machine to a work bench or table. The extension 3 is provided on each side with a groove 5 of rectangular cross section, as shown, or otherwise, and these grooves are adapted to slidably receive the tongues 6 on the inner sides of the opposite and parallel arms 7 of the saw rest 8 which is provided with an upwardly extending flat portion 9 adapted to receive and hold the outer edge of a saw blade. The arms 7 extend inwardly toward the center of the base 1 from the block portion 9 and are provided at the top with flat extensions 9' adapted to slide upon the top of the base extension 3 and serve as an additional guide for the saw rest 8. In the form of base shown, which is adapted to be secured rigidly to a work bench or table, it is necessary to countersink the vertical bore 4 in the extension 3, as at 10, to provide a seat for the head of the bolt or screw in order that the saw rest 8 may be moved longitudinally over the full length of the base extension 3.

The central portion of the base 1 has a vertical extension 11 with an outwardly projecting lug 12 on one side and a pair of opposite lugs 14 on the other side thereof, between the latter of which the handle 16 is adapted to be pivoted on a pin or screw 15 secured in the lugs 14. A vertically disposed die holder 17 is bifurcated at the upper end and pivotally secured to the handle 16 by means of the pin or screw 18, the handle 16 being held between the furcations 19 and 20, the central portion of the die holder 17 being slidably seated in a suitable vertical aperture 13 in the lug 12, and the lower portion 21 thereof carries a die member 22 which is slidably seated in a lateral groove 21' extending the full width of the die holder 17, and is adapted to be locked and held in a stationary position on the die holder by means of a pin 22' which may be inserted in suitable bores in the die holder 17 and in the upper side of the die member 22. A similar die member 23 is similarly seated in a groove 23' in the flat upwardly extending portion 24 on the base 1 and is adapted to be held in a stationary position by means of the pin 24' in the side of the extension 24, similar in function and mounting to the pin 22' in the die holder 17. The die seats 21' and 23' in the die holder 17 and the extension 24, respectively, may be dovetailed, as shown, or of any other form adapted to hold the die members rigidly in position.

The tooth seats 25 in the opposite faces of the die members 22 and 23 incline downwardly from the front edge of the die members and alternate on the faces of the dies with the tooth seats 26 which incline upwardly from the front edges of the die members, both forms of the seats being angular to conform to the shape of the saw teeth and separated by the angular flat spaces 27, as shown in Figs. 5, 6, 7 and 8. Thus the tooth seats 25 are in the form of depressions in the dies and the seats 26 are in the form of raised extensions from the face thereof.

The lower die member 23 is slightly longer than the upper die member 22 and is provided with an extra tooth seat, by means of which the saw may be properly set between the dies at the beginning of or at any time during a saw setting operation, by placing the last tooth which has been previously set, or the first tooth at the end of the saw on the extra tooth seat so that the remainder of the teeth between the dies may register with the tooth seats thereon.

As a limiting means for the die holder 17 I may provide a flat topped lug 28 on the base 1, as shown in Fig. 3 the upper side of the lug 28 being adapted to be engaged by the lower end of the die holder 17. The die members 22 and 23 are designed to be tightly fitted into the grooves 21' and 23', respectively so that when once placed in position in the machine the jar or movement thereof may not cause a movement of the dies in their seats and move them out of registration, the pins 22' and 24' serving as an additional and positive locking means therefor. It should be understood that a number of sets of dies of different pitch may be provided with each machine corresponding to the pitch of the teeth of different size saws, as ordinarily used by mechanics in the trade, and that when the dies are correctly placed in position in the machine, the tooth seats 25 of one of the die members will register with the tooth seats 26 of the other die member.

In operation, when a saw blade is placed in the machine so that the toothed edge lies between the two die members 22 and 23 and the outer edge of the blade rests upon the block 9, care being taken that the teeth of the blade rest in and are in positive registration with the tooth seats in upper face of the lower die member 23, the handle 16 may be depressed so as to force the upper die member 22 firmly against the upper edge of the teeth in the saw blade and the lower die member 23 in contact with the lower edge of the teeth. This operation will cause a number of the saw teeth equal to the number of tooth seats on the die members to be properly set to correspond to the dies and likewise, as before stated, the saw blade being moved so that the last of the set teeth registers with the extra tooth seat on the lower die member 23, more teeth may be set, and so on until the saw has been placed in the proper condition for use.

The form of my invention may be changed in some of the minor particulars without departing from the spirit of my invention as defined in the appended claims or enlarging the scope thereof, and as hereinbefore stated, some minor alterations may be necessary in order to adapt the machine to use as a portable fixture.

Having thus described, my invention, what I claim is:

1. In a device of the character described, the combination of a stationary base capable of being rigidly secured to a table or bench and having an upward extension integral therewith, an operating member pivotally held on said extension, a crosshead vertically slidable in said extension and pivotally connected with said operating member, guide means formed on said base and saw holding means adjustably carried on the guide means, dove-tailed die seats formed in the upper side of the base and the lower end of the crosshead, and multiple saw setting dies removably held in said seats, said dies having a plurality of alternately formed oppositely inclined beveled surfaces and flat surfaces intermediate thereof for simultaneously setting a plurality of teeth in a saw at a single operation.

2. In a device of the character described, the combination of a stationary base, an operating member, means integral with the base to which the operating member is pivoted, guide means formed thereon, a crosshead pivotally connected with the operating member and vertically slidable in said guide means, longitudinally adjustable saw holding means on the base, dovetailed die seats formed in the base and the crosshead, a stationary die removably held in the seat in said base, and a movable die held in the seat in said crosshead, and means for locking said dies rigidly in their seats, said dies having means for simultaneously setting a plurality of saw teeth at a single operation.

EDGAR E. LINCOLN.

Witnesses:
VERNE H. LINCOLN,
J. D. HASKIN.